Inventor
Donald G. Melin

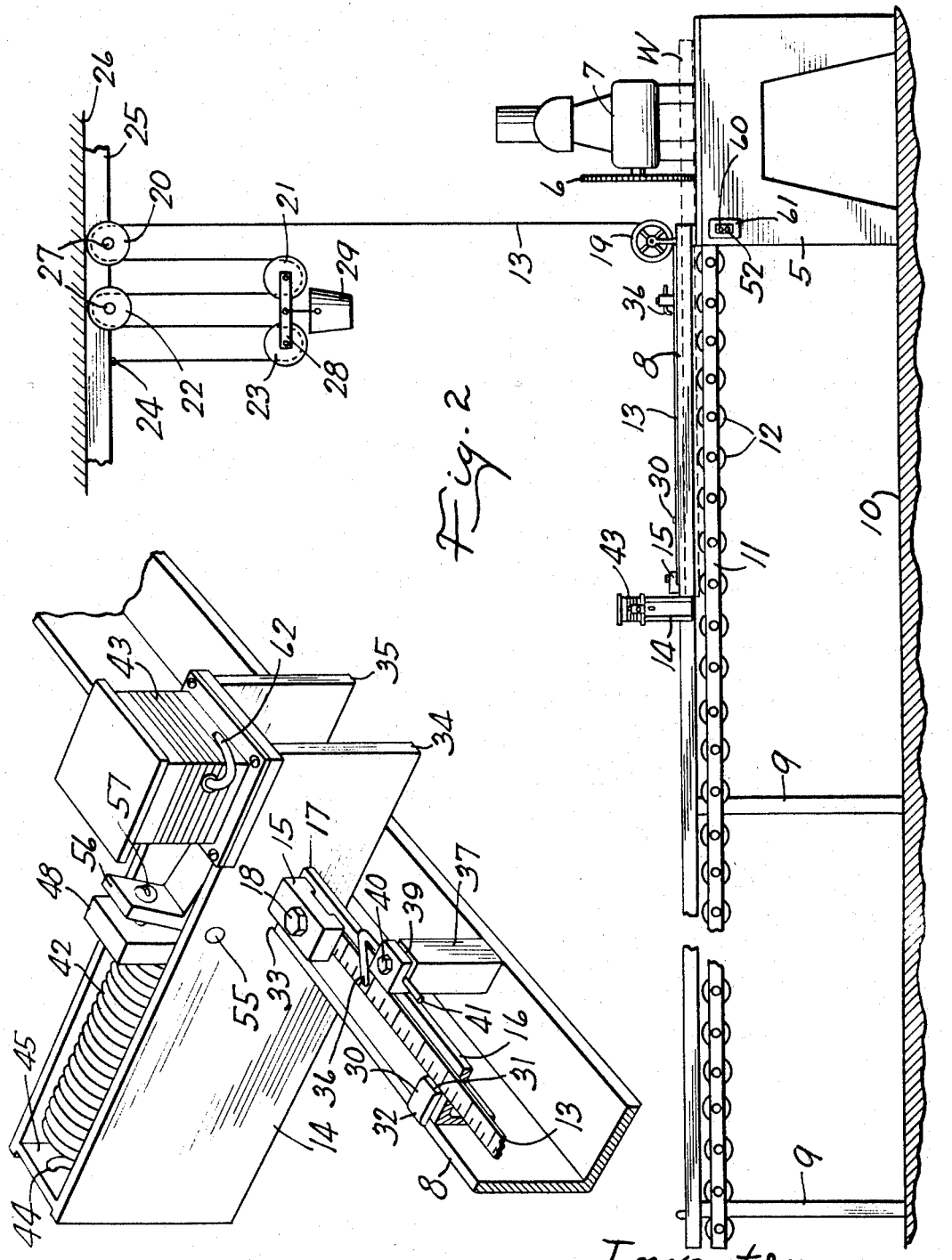

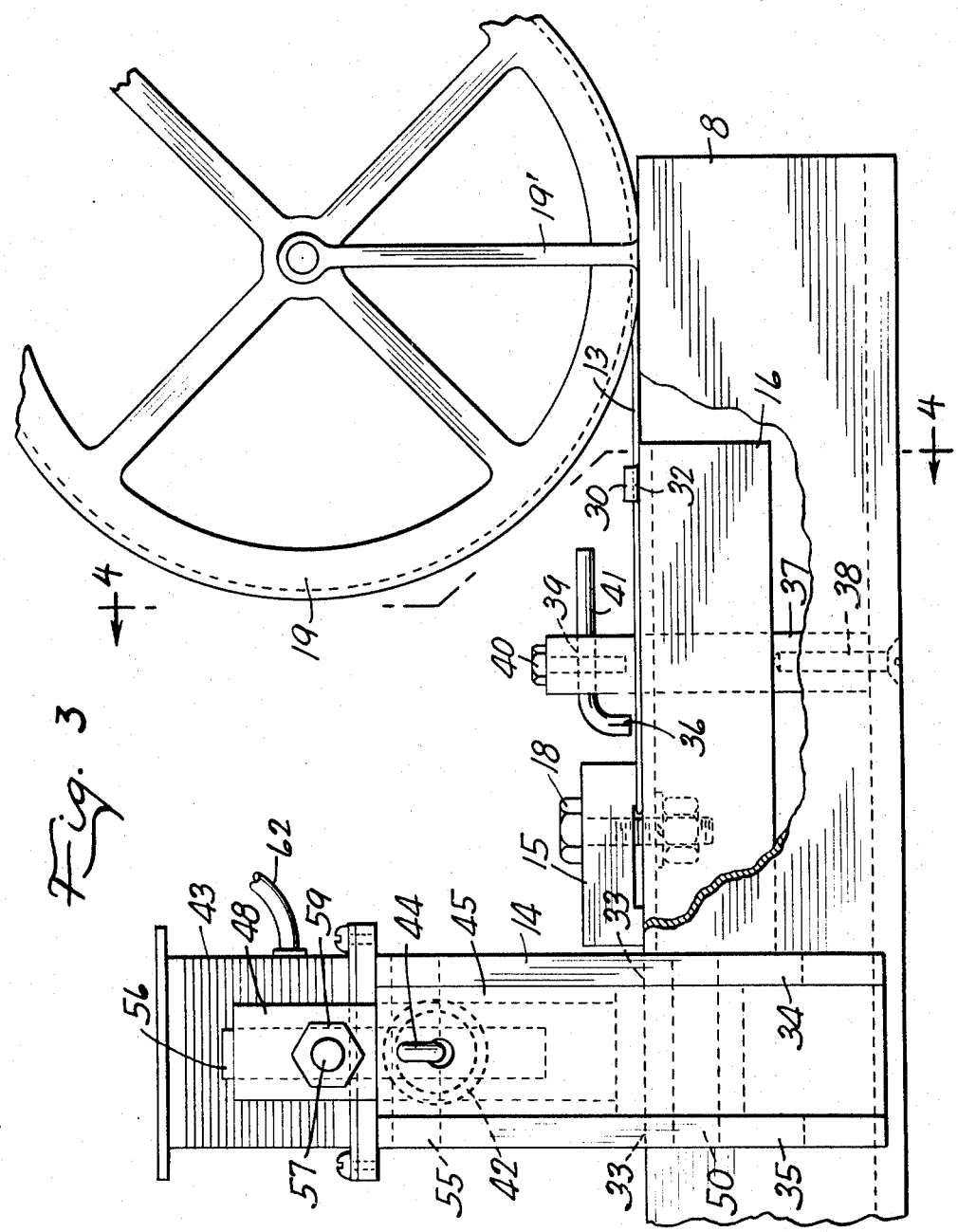

Andrew F. Wintercorn
Attorney

United States Patent Office 3,391,717
Patented July 9, 1968

3,391,717
LENGTH MEASURING APPARATUS
Donald G. Melin, Rockford, Ill., assignor, by mesne assignments, to Andrew F. Wintercorn, Rockford, Ill.
Filed Feb. 10, 1966, Ser. No. 526,519
10 Claims. (Cl. 143—174)

This invention relates to a length measuring apparatus suitable for application, for example, to a saw-bench for measuring lengths of lumber when cutting the same, although, of course, other uses, such, for example, as cutting pipe or electrical conduit to accurately measured lengths would immediately be suggested, whether the cutting after measuring involved sawing or cutting by other means.

I am aware that others have devised length measuring apparatus for a similar purpose but all of these prior constructions were either too complicated or too expensive for widespread use, or were subject to the objection that they were not handy enough to save appreciable time, and could not be quickly and easily reset to correct for slight differences in length measurement traceable to dulling of the sawteeth, and for these reasons and others, such apparatuses have not replaced old methods and means of measurement of workpieces. It is, therefore, the principal object of my invention to provide a length measuring apparatus of simpler and more economical construction, capable of being installed on a saw-bench very easily and reset readily to compensate for dulling of the sawteeth, so that inaccuracies in measurement that were heretofore tolerated in earlier constructions by making small allowances for error in measurement, which would necessarily have to be approximate, are no longer a factor and cutting accurately to length is possible at all times.

Salient features of the length measuring apparatus of my invention are:

(1) Use of an overhead system of vertically spaced fixed and movable pulleys over and under which the flexible steel measuring tape is extended up and down to accommodate the desired length of tape conveniently while at the same time providing for the return of the movable stop on the far end of the tape with substantially uniform tension automatically by the graviation of a weight on the movable lower set of pulleys, and (2) The provision on the stop of spring pressed clamp means for holding the stop securely in a set position and power operated means (electrical, pneumatic or hydraulic) for releasing the clamp means during the intervals when the stop must be moved one way or the other for a new length of workpiece that is being measured, this arrangement avoiding the use of any electrical current (where the release is operated by electrical solenoid) except for brief intervals, the operator merely depressing an "on" button at his station when he wants the stop to be free to move with the workpiece having one end abutting the same and then depressing the "off" button when the desired length is reached, as indicated on the tape.

The invention is illustrated in the accompanying drawings, in which:

FIG. 1 is a perspective view of the movable stop to which one end of the flexible steel measuring tape is affixed;

FIG. 2 is a front view of a saw-bench showing the length measuring apparatus of my invention applied thereto, the stop shown in FIG. 1 being illustrated on a smaller scale here as having been moved to the left away from the sawblade by a workpiece W indicated in dotted lines that is to be cut to a certain length after measurement;

Figure 4:
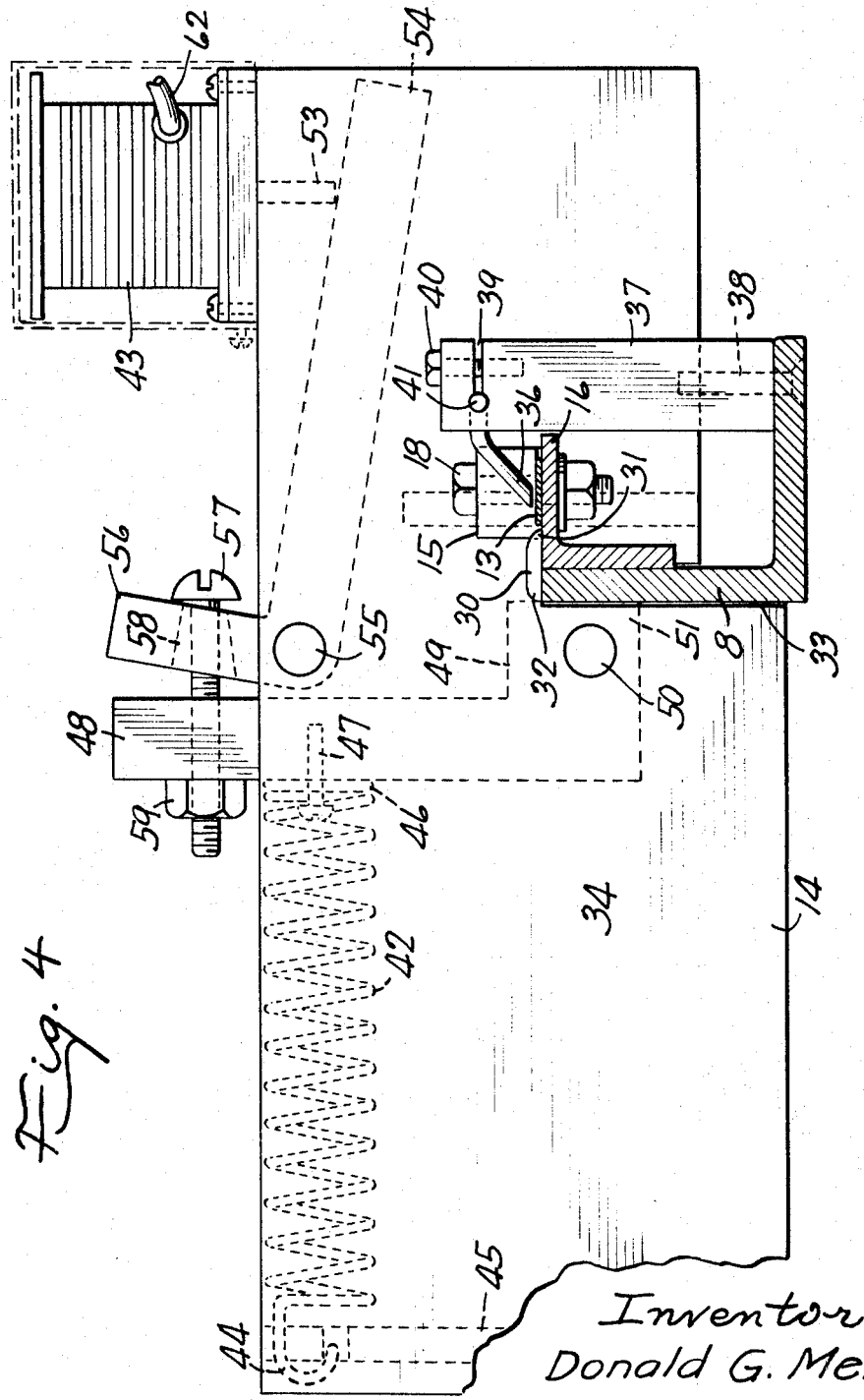

FIG. 3. is a front view of FIG. 1 with the stop shown close to the guide pulley at one end of the saw-bench near the saw, and FIG. 4 is a section on the line 4—4 of FIG. 3.

The same reference numerals are applied to corresponding parts throughout the views.

Referring to the drawings, as shown in FIG. 2, the saw-bench 5 has a circular saw 6 and its electric drive motor 7 mounted thereon and suitably guided for straight line movement back and forth horizontally in right angle relation to the end of an angle iron work abutment 8 disposed horizontally in slightly elevated relation to the top of the saw-bench 5 and extending away from it and supported on a frame 9 in spaced parallel relationship to the floor 10. The frame 9 also supports the frame 11 of a work support or conveyor made up of a multiplicity of spaced parallel free running rollers 12, the tops of which are all in one horizontal plane slightly below the level of the angle iron work abutment 8 previously mentioned, so that a workpiece W to be measured first and then sawed will rest on the rollers 12 in abutment with the angle iron 8 so as to be held in square relation to the saw blade 6 when the saw is brought forward to cut the piece to a predetermined length determined by my improved length measuring apparatus, which will now be described.

A flexible steel measuring tape 13, which has one end thereof suitably affixed to and movable with a stop 14, as indicated by the clamp 15, extends horizontally from the stop 14 over the top of an angle iron support 16 that is welded or otherwise suitably secured at 17 to one side of the stop 14, the means 15 previously mentioned being in the form of a clamp that is bolted, as indicated at 18, to the horizontal top flange of the angle iron support 16 next to the stop 14. The tape 13 extends horizontally under a vertically disposed guide pulley 19 suitably mounted, as at 19', on one end of the angle iron 18, and then extends vertically upwardly over the first pulley 20 of a system of pulleys 20–23, going down under pulley 21 and up over pulley 22 and down under pulley 23 to the point 24 where that end of the tape is affixed to the frame 25 mounted on the ceiling 26. The two upper pulleys 20 and 22 have fixed supports on the frame 25, as indicated at 27, but the two lower pulleys 21 and 23 are movable up and down with a yoke or frame 28 on which a weight 29 is suspended, whereby not only to provide accommodation for the required length of tape 13 conveniently but at the same time provide for the return of the movable stop 14 on the far end of the tape automatically by the gravitation of the weight 29 with the movable lower set of pulleys 21 and 23. A lug 30 welded to the top of the angle iron support 16 has its one side 31 serving as a guide against which to line up the clamped end of the tape 13 in parallel relationship to the work abutting angle iron 8 while the other end 32 has slidable engagement on the top edge of the angle iron 8 to guide the stop 14 in its movement lengthwise thereof, the angle iron support 16 for the tape 13 serving by abutment with the outer face of the vertical flange of the angle iron 8 to assume the side thrust on the stop 14 when the end of the workpiece W is pressed against the stop to slide it away from the sawblade 6 against the pull of tape 13, the stop 14 being slotted vertically as shown at 33 in FIG. 4 on its opposed side walls 34 and 35 to receive the vertical flange of the angle iron 8 as a guide and support.

An easily adjustable index or pointer is provided at 36 on a fixed support 37 secured in any suitable manner, as indicated at 38, to the horizontal flange of the work abutting angle iron 8 at a predetermined distance from the saw 6. The post 37 is slotted transversely at its upper end, as indicated at 39, and has a screw 40 for contracting this slotted portion to clamp the shank 41 of the pointer 36 frictionally so that the pointer, upon loosening of the screw 40 can easily be slid a small fraction of an inch to the right or left, as the case may be, parallel to the angle iron 8, to indicate the correct measurement of the distance from the saw 6 to the stop 14 on tape 13, extending directly under the index 36. Long steel measuring tapes like that shown at 13 usually have the number of feet labeled thereon at regular intervals so that the operator using the present apparatus to measure the length of a workpiece W to be cut, can read the length directly from the tape in feet and inches by means of the index 36, and he will have no trouble doing this while standing in front of the saw-bench 5, as this index is then directly in front of him.

The stop 14 is arranged to be clamped under action of a coiled tension spring 42 in any set position but freed by temporary energization of an electrical solenoid 43, the spring 42 being anchored at one end, as at 44, to the end wall 45 in the stop 14, while the other end 46 is suitably secured by means of a screw 47 to the vertical arm 48 of a bell-crank lever that is pivoted by means of its horizontal arm 49 between the side walls 34 and 35 of the stop 14, as indicated at 50, the pivot 50 being so related to the lower corner portion 51 of the bell-crank lever, so that this corner portion takes a firm hold on the vertical flange of the angle iron 8 under action of spring 42 whenever the solenoid 43 is de-energized. However, when the solenoid 43 is energized by the operator depressing the "on" button 52 on the front of the saw-bench 5, the armature 53 is forced down against the generally horizontal arm 54 of the bell-crank lever pivoted at 55 between the side walls 34 and 35 of the stop 14, so that the generally vertical arm 56 of this bell-crank lever exerts a pull on bolt 57, that extends through a hole 58 provided in the arm 56 and is adjustably secured, as at 59, to the previously mentioned arm 48 of the bell-crank levers 48–49, whereby to release the stop 14 against the action of spring 42, and thus allow the stop 14 to be moved freely by thrust of the end of a workpiece W against it. Of course, the instant the stop 14 is released, it tends to move toward the saw 6 under gravitation of the weight 29, causing a pull on the tape 13 in that direction. The operator must, therefore, be careful not to release the stop 14 without a workpiece in place for abutment with it. After the workpiece has been moved to the left far enough to get the desired length indicated at 36, the operator then depresses the "off" button 60 to de-energize the solenoid 43, and allow the spring 42 to again take over and clamp the stop 14. The switch 61 containing the "on" and "off" buttons 52 and 60, respectively, has a flexible wire 62 extending from it to the stop 14, and, of course, this conductor is more than long enough to reach to the far end of the work abutting angle iron 8 from switch 61, and there is another conductor (not shown) extending from the switch 61 to any nearby 110 volt electrical outlet.

In operation, whenever a workpiece W to be measured is laid on the saw-bench 5 with one end abutting the stop 14, the operator depresses the "on" button 52 to energize the solenoid 43 and thus release stop 14 for movement. When the workpiece W has been moved endwise far enough to the right or left so that the desired dimension is shown at 36 he depresses the "off" button 60, allowing spring 42 to operate clamps 49–49 to lock the stop 14 in its adjusted position. Thus, several pieces can then all be cut to exactly the same dimension. When the sawteeth of saw 6 get dull, a slight correction of the indicator 36 can be made to compensate for this. From time to time, therefore, a careful operator will check the actual length of a workpiece W with the indicated length to be sure the indication is right. If desired, the clamp 15 may be released to make a correction and tightened again thereafter, but, it is preferred usually to make the corrections at 36. A rubber bumper may be provided on the angle iron 8 for abutment with the end of the angle iron 16 to prevent collision of the clamp 15 with the indicator 36 if the stop 14 is released when there is no workpiece W in position to have abutment with the stop.

It is believed the foregoing description conveys a good understanding of the objects and advantages of my invention. The appended claims have been drawn to cover all legitimate modifications and adaptations.

I claim:

1. A workpiece length measuring apparatus for use with a bench saw or other cutter, and an elongated horizontal work support on which an elongated workpiece to be measured is adapted to rest while the end portion to be cut off transversely relative to the work support is disposed adjacent the cutter, said apparatus comprising a stop for abutment with the other end of the workpiece guided for movement lengthwise of the support, a flexible elongated measuring tape having one end secured to and movable with said stop, a first guide pulley at the cutter end of said work support under which said tape is extended horizontally from the stop in close parallel relation to said support to enable measuring the length of a workpiece disposed on said support parallel thereto, said tape extending away from said first guide pulley over a second guide pulley fixedly mounted in spaced relation to said first guide pulley, weight means suspended on said tape which in its gravitation takes up slack in said tape and urges said stop normally toward the cutter end of said support with substantially uniform tension into firm engagement with the end of a workpiece resting on said support, and length indicator means in a fixed relation to said support cooperating with said tape to indicate the length of workpiece between said stop and cutter.

2. A length measuring apparatus as set forth in claim 1 including stop clamping means remotely controlled from the cutter end of said work support.

3. A length measuring apparatus as set forth in claim 1 including stop clamping means remotely controlled from the cutter end of said work support, said means comprising a clamp, spring means for applying the clamp, and manually controlled power means for releasing the clamp.

4. A length measuring apparatus as set forth in claim 1 inluding stop clamping means remotely controlled from the cutter end of said work support, said means comprising a clamp, spring means for applying the clamp, and manually controlled electrical solenoid means for releasing the clamp.

5. A length measuring apparatus as set forth in claim 1 including a second support for the length indicator means in fixed relation to said work support, said length indicator means comprising a pointer on one end of an elongated shank adjustable endwise thereof relative to said second support in parallel relation to said tape and means for frictionally clamping the same in adjusted position.

6. A length measuring apparatus as set forth in claim 1 wherein said second guide pulley is one of a plurality of guide pulleys fixedly mounted in elevated relation to said first guide pulley and in spaced relation to one another, the other end of said tape being fixed in laterally spaced relation to that one of said plurality of fixed guide pulleys remote from said second fixed guide pulley, the weight means suspended on said tape being carried on other guide pulleys gravitating with said weight means and movable up and down below the fixed guide pulleys and having that portion of said tape between said fixed end and said second guide pulley extended back and forth between the fixed and movable pulleys in a predetermined order so as to maintain all of said tape free of any slack.

7. A length measuring apparatus as set forth in claim 1 including an elongated angle iron mounted alongside of and parallel to said work support serving both as a horizontal guide rail for guided support on its vertical flange of said stop and as a locating and aligning abutment for a workpiece on one side of said flange.

8. A length measuring apparatus as set forth in claim 1 including an elongated angle iron mounted alongside of and parallel to said work support serving both as a horizontal guide rail for guided support on its vertical flange of said stop and as a locating and aligning abutment for a workpiece on one side of said flange, said stop comprising fixedly spaced parallel side walls having registering vertical slots provided therein receiving said vertical flange, a clamp element pivoted between said walls and abutting one side of said flange, a spring normally urging said clamp element into clamping engagement with said flange, and manually controlled power operated means for occasionally moving said clamp element in the opposite direction to free said stop for movement.

9. A length measuring apparatus as set forth in claim 1 including an elongated angle iron mounted alongside of and parallel to said work support serving both as a horizontal guide rail for guided support on its vertical flange of said stop and as a locating and aligning abutment for a workpiece on one side of said flange, a rigid horizontal elongated projection on one side of said stop parallel to and in sliding abutment with the upper edge portion of the vertical flange of said angle iron on its outer side away from said work support to assume side thrust when said stop is moved along said angle iron by a push from the end of a workpiece resting on said work support, said projection having the first mentioned end of said measuring tape secured thereto so it extends in close parallelism to the upper edge of said flange.

10. A length measuring apparatus as set forth in claim 9 including a short horizontal projection on one side of the elongated projection at its outer end slidable on the upper edge of said flange to maintain parallel relationship of said elongated projection to the upper edge of said flange.

References Cited
UNITED STATES PATENTS

| | | |
|---|---|---|
| 2,675,836 | 4/1954 | Ellis. |
| 2,731,989 | 1/1956 | Valcourt et al. ___ 143—168 XR |
| 2,742,935 | 4/1956 | Action _____ 143—168 XR |
| 2,747,625 | 5/1956 | Small. |

WILLIAM W. DYER, JR., *Primary Examiner.*

W. D. BRAY, *Assistant Examiner.*